United States Patent [19]

Walton et al.

[11] Patent Number: 4,858,381
[45] Date of Patent: Aug. 22, 1989

[54] FLORAL CONTAINER AND WATER RESERVOIR

[75] Inventors: Charles F. Walton; Robert J. Sucheski, both of Hudson; James F. Bridenbaugh, Columbus; James J. Chapman, Ravenna, all of Ohio

[73] Assignee: Smithers-Oasis Company, Kent, Ohio

[21] Appl. No.: 145,214

[22] Filed: Jan. 19, 1988

[51] Int. Cl.⁴ ............................................. A01G 27/00
[52] U.S. Cl. ..................................... 47/79; 47/41.12; 47/48.5; 47/41.01
[58] Field of Search .............. 47/79, 81, 41 R, 41.12, 47/48.5, 84, 80, 82

[56] References Cited

U.S. PATENT DOCUMENTS

| 2,994,985 | 8/1961 | Jackson, Jr. | 47/41.12 X |
| 3,043,053 | 7/1962 | Peters | 47/80 |
| 3,127,698 | 4/1964 | Smithers | 47/41 |
| 3,192,665 | 7/1965 | Cloud | 47/80 |
| 3,368,303 | 2/1968 | Tong | 47/41.12 |
| 3,557,490 | 1/1971 | Delaney | 47/81 |
| 3,753,315 | 8/1973 | Adam | 47/79 |
| 3,758,987 | 9/1973 | Crane, Jr. | 47/80 |
| 3,783,555 | 1/1974 | Peters | 47/79 |
| 3,896,586 | 7/1975 | Caldwell | 47/79 X |
| 4,106,234 | 8/1978 | Gallo | 47/55 |
| 4,219,967 | 9/1980 | Hickerson | 47/81 X |
| 4,287,682 | 9/1981 | Browne | 47/81 |
| 4,299,054 | 11/1981 | Ware | 47/84 X |
| 4,335,540 | 6/1982 | Allen | 47/79 |
| 4,428,151 | 1/1984 | Solomon | 47/81 |
| 4,527,354 | 7/1985 | Sellier | 47/81 |
| 4,531,324 | 7/1985 | Yang et al. | 47/81 |
| 4,667,439 | 5/1987 | Maillefer | 47/81 |

FOREIGN PATENT DOCUMENTS

| 7317395 | 12/1973 | Netherlands | 47/81 |
| 85855 | 7/1955 | Norway | 47/81 |
| 107482 | 2/1962 | Norway | 47/79 |

Primary Examiner—Robert A. Hafer
Assistant Examiner—Kevin G. Rooney
Attorney, Agent, or Firm—Renner, Kenner, Greive, Bobak, Taylor & Weber

[57] ABSTRACT

A floral container (10, 110) is manufactured to have an internal chamber (30, 135) which serves as a fluid reservoir. The chamber (30, 135) is essentially closed to the environment. A cavity (20, 130) is recessed into the container (10, 110) and opens to receive a block of floral foam (32, 138) which is capable of supporting an arrangement of cut flowers. One or more ports (33, 139) are provided to permit facile filling of the chamber (30, 135) with fluid (31, 136). A plug means (32, 34 or 37) may be provided selectively to seal the ports (33, 139). One or more slots (35, 140) are provided between the chamber (30, 135) and the cavity (20, 130) to accommodate a wick (36, 141). The wick (36, 141) extends into the chamber (30, 135) and beneath the level of the fluid (31, 136) therein. Capillary action transports water along the wick (36, 141) which extends through the slot (35, 140) and into the cavity (20, 130). The wick (36, 141) is preferably impregnated with a floral preservative. The block of floral foam (32, 138) engages that portion of the wick (36, 141) in the cavity (20, 130) such that the fluid (31, 136), and any preservative dissolved into the fluid (31, 136) from the wick (36, 141), may be transmitted into, and throughout, the block of floral foam (32, 138), also by capillary action, for watering and nourishing the floral arrangement supported by block of floral foam (32, 138).

9 Claims, 2 Drawing Sheets

FLORAL CONTAINER AND WATER RESERVOIR

TECHNICAL FIELD

The present invention relates generally to horticultural devices. More particularly, the present invention relates to devices for supporting floral arrangements. Specifically, the present invention relates to a relatively spill-proof container for supporting, watering and, if desired, nourishing floral arrangements.

BACKGROUND OF THE INVENTION

The present invention relates to containers for supporting floral arrangements and more particularly to containers that provide for continuous watering and, if desired, nourishing of flowers forming the arrangement supported by the container.

It must be understood that the prior art discloses a device by which to supply water to potted plants. Specifically, water is supplied, by capillary action, to a pad which is adjacent to the bottom of a plant-holding pot, and the wet pad makes water available to be absorbed into the growing medium within the pot. This device is disclosed in U.S. Pat. No. 4,343,109.

A structure embodying the concepts of the aforesaid prior art patent incorporates a water reservoir that is open to the atmospheric environment in such a way that it is not only subject to evaporation but is also highly susceptible to spillage, if the container is tilted or moved without considerable care. Such a structure requires constant care and attention in order to ensure not only that an adequate supply of water is available and that the water will not be spilled as the device is moved but also that the tab which extends from the pad into the water reservoir remains immersed in water. Moreover, it should be noted that the prior art device is intended for the preservation of live plants and is not disclosed as being adaptable for cut flower arrangements.

When cut flower arrangements are given to someone who is recovering in a health care institution, the flowers either wither in a short period of time, or require that one of the health care personnel use precious time to water the flowers. The time of health care personnel is not only extremely valuable but is also quite limited. As such, any device that can relieve the workload of such personnel is highly useful.

SUMMARY OF THE INVENTION

It is, therefore, a primary object of the present invention to provide an improved container for supporting floral arrangements which incorporates a chamber that serves as a reservoir for holding liquid to water and nourish the floral arrangement supported thereby, the configuration of the chamber being such that the liquid received therein is not readily capable of being spilled.

It is another object of the present invention to provide a container, as above, which incorporates a cavity adapted to receive, and retain, a block of floral foam into which the stems of the cut flowers forming a floral arrangement are insertably received.

It is a further object of the present invention to provide a container, as above, which incorporates a wicking means to transmit fluid, such as water, from the chamber to the block of floral foam received in the cavity.

It is a still further object of the present invention to provide a container, as above, wherein the wicking means may be impregnated with a floral preservative that can be continuously dissolved in the liquid passing therethrough.

Accordingly, it is an encompassing object of the present invention to provide a container, as above, which can be delivered to the recipient not only with the floral arrangement in place but also with the complete water needs for the life of the floral arrangement already stored within the chamber, thus assuring the maximum useful life for the floral arrangement.

These and other objects of the invention, as well as the advantages thereof over existing and prior art forms, which will be apparent in view of the following detailed specification, are accomplished by means hereinafter described and claimed.

As will become apparent, the present invention eliminates the need to have cut flower arrangements constantly monitored for moisture content. Moreover, a container embodying the present invention can be readily moved without fear of spilling the water stored therein.

In general, a floral container embodying the concepts of the present invention incorporates a chamber capable of holding a predetermined volume of fluid such as water. At least one port is provided for filling the chamber. The container also presents a cavity within which a block of floral foam is insertably received.

A wicking means is employed to transfer water from the chamber to the cavity by capillary action. Specifically, the capillary action transports the water to the floral foam and then to the stems of the flowers which are supported within the block of floral foam presented from the container. The amount of water that is originally provided in the chamber is determined, primarily by experience, to be sufficient to keep the flowers fresh for the expected life of the floral arrangement. The wicking means may also be impregnated with a floral preservative which will progressively dissolve in the water moving along the wicking means by capillary action. The amount of water and preservative necessary to maintain the flowers in a fresh condition during the expected life of the floral arrangement will be known to those skilled in the horticultural art of floral arrangements.

Two exemplary embodiments of floral containers are shown by way of example in the accompanying drawings and are described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
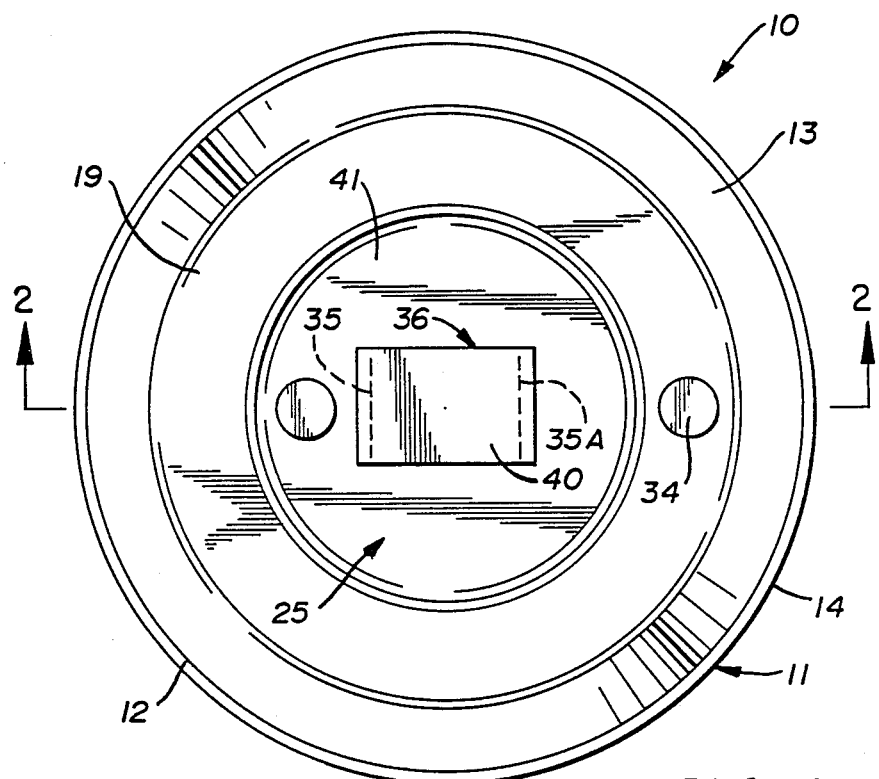
FIG. 1 is a top plan view of an exemplary floral container embodying the concepts of the present invention.

One representative form of a floral container embodying the concepts of the present invention is designated generally by the numeral 10 on the accompanying drawings. The representative container 10 has a peripheral wall 11, the exterior of which may present an aesthetically pleasing configuration which incorporates the designer's preference for the size of the container 10 selected. In the embodiment depicted the peripheral wall 11 presents an annular, central portion 12. The upper extremity of the annular central portion merges into a first, or upper, frustro-conical surface 13, and the lower extremity of the annular, central portion 12 terminates in a rib 14 which extends radially outward and then radially inwardly to merge with a second, or lower, frustro-conical surface 15. The second, or lower, frustro-conical surface 15 merges into a second rib 16 which may, as depicted, extend annularly to provide the foot portion which supports the container 10. The rib, or foot portion, 16, in turn, merges with the vertically upwardly displaced, bottom wall 18 of the container 10.

The first, or upper, frustro-conical surface 13 terminates in a horizontally disposed, top surface 19 which circumscribes a cavity 20. The cavity 20 has a peripheral wall 21 that extends vertically downwardly from the top surface 19 to intersect a transversely oriented divider wall 25.

Figure 2:
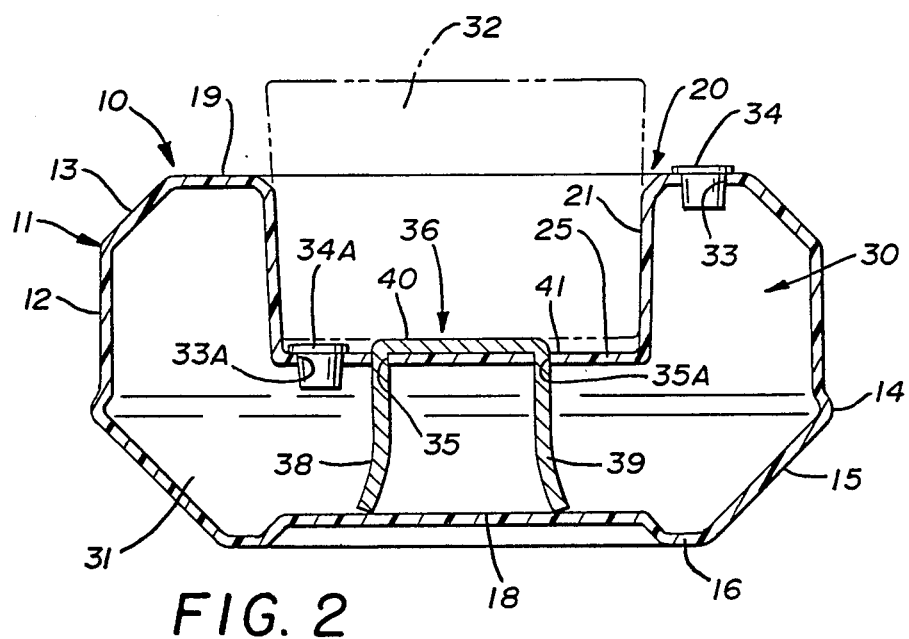
FIG. 2 is a vertical section taken substantially along line 2—2 of FIG. 1.

It should be appreciated that the structure described to this point defines an interior chamber 30 which, as will be hereinafter described in greater detail, serves as a reservoir for the fluid, indicated generally by the number 31, that is provided to extend the useful life of the floral arrangement supported by the container 10. As best depicted in FIG. 2, the wall 21 which delineates the side of cavity 20 extends downwardly into the chamber 30.

The cavity 20 is open at the top to permit facile insertion of a block of floral foam 32 therein. The block of floral foam 32 will, as is well known to the art, support an arrangement of fresh, cut flowers, not shown. It should also be appreciated that the dimensions of the block of floral foam 32 are such that the block 32 will fit snugly against the peripheral wall 21 of the cavity 20 and thereby effectively seal the divider wall 25 from the environmental atmosphere exterior of the container 10 when a block of floral foam 32 is received within the cavity 20. As depicted, the block 32, and the peripheral wall 21, may be of mating cylindrical configuration. However, it should be understood that any mating configuration between the block 32 and the wall 21 of cavity 20 should be acceptable.

At least one port 33 is provided through which the chamber 30 may be filled with fluid 31. The port 33 may, for example, penetrate the top surface 19, and when the port 33 is so located, a plug 34 may be desirably employed selectively to close the port 33. Moreover, by locating the port 33 in the top surface 19, one may conveniently fill the entire chamber 30. Alternatively, a port 33A may penetrate the divider wall 25. By so locating the port 33A, one may rely upon the block of floral foam 32 received within the cavity 20 to close the port 33A. Even so, however, one may, if desired, employ a plug 34A, as shown. The ability to eliminate the potential desirability for the plug 34A may well be an advantage. Nevertheless, it should be appreciated that by locating the port 33A through the divider wall 25 it will not be convenient to fill the chamber 30 above the level of the divider wall 25, although, as should become apparent, it may not be necessary to fill the chamber 30 above the level of the divider wall 25 in order to provide the necessary volume of fluid 31 for the particular arrangement supported in the container 10. In any event, the required volume for chamber 30 should be given consideration when selecting the overall dimensions for the container 10.

The divider wall 25 is perforated by at least one slot 35 to permit a wick 36 to pass through the divider wall 25 and transfer the fluid 31 within the chamber 30, by capillary action, into the cavity 20. The fluid 31 within the cavity 20 is made available to the flower stems received within the block of floral foam 32, also by capillary action within the block 32. Preferably two slots 35 and 35A are provided in the divider wall 25. The slots 35 and 35A are laterally spaced and disposed in parallel relation to receive a wick 36 in the manner depicted in FIG. 2. The wick 36 is preferably of a band-like cross sectional configuration to present opposite end portions 38 and 39 that are separated by a medial portion 40. The opposite end portions 38 and 39 are received through the slots 35 and 35A, respectively, with the medial portion 40 disposed in contiguous juxtaposition with the upwardly directed face 41 of the divider wall 25. The transverse edges of the end portions 38 and 39 preferably terminate in close proximity to the bottom wall 18 of the chamber 30.

It is mandatory that the medial portion 40 of the wick 36 engage the block of floral foam 32 received within the cavity 20 so that the fluid 31 within the wick 36 can be transferred into the block 32. It should be appreciated that by making the end portions 38 and 39 of the wick 36 fit snugly within the respective slots 35 and 35A, only the fluid 31 which is being transported along the wick 36 by capillary action will move through the slots 35 and 35A from the chamber 30 into the cavity 20.

The wick 36 may preferably be made from polyester, or other inert material, that has an open weave which will promote capillary action. In addition, the wick 36 may be impregnated with a floral preservative, comprised of sugar, citric acid, and a germicide. Suitable floral preservatives are commercially available. One such preservative is commercially available from the assignee of the subject invention under the trademark OASIS FLOREVER.

The wick 36 will transport water from the chamber 30 to the block of floral foam 32 and in the process will progressively dissolve the floral preservative with which the wick 36 has been impregnated. Capillary action in the foam will likewise transmit the water, and preservative, to the stems of the flowers that are supported within the block 32. This will keep the cut flowers in a fresh condition for an extended period of time. The amounts of water and preservative necessary to accomplish the desired objective are known to florists and other persons who are familiar with the preparation of floral arrangements.

Because the chamber 30 has only minimal, direct exposure to atmosphere, the level of the fluid 31 within the chamber 30 will not be depleted by evaporation. Of perhaps even greater significance, the fluid 31 will not spill as the container 10 is jostled during movement from one place to another. In addition, once the container 10 is filled with fluid, and thereafter delivered to the recipient, there is no further need to have anyone water the flowers. Thus, personal attention is not required to maintain the flowers in a fresh condition.

The container 10 may be made from virtually any material which is suitable for supporting a floral arrangement and which is capable of incorporating a chamber to hold fluid. Such materials as plastic, glass and various ceramics come immediately to mind.

Solely for the purpose of facilitating the necessary understanding of the present invention, the following brief description of how containers embodying the concepts of the present invention may be manufactured from plastic is included.

With an understanding as to how the container 10 can be made from one material those skilled in the art, who understand how the container operates, can certainly manufacture the container from other suitable materials.

One accepted approach would be to make the container 10 in one piece, as by employing a centrifugal casting process commonly termed "rotational casting." Such a process is disclosed in U.S. Pat. No. 2,629,134 which was issued on Feb. 24, 1953 to R.P. Molitor.

There are, of course, other perfectly acceptable manufacturing methods and processes. For example, the container can be formed in two parts which are then bonded together. Mating halves of the container 10 may well be formed from a thermoplastic material such as polyvinyl chloride (commonly designated as PVC) by injection molding, or vacuum forming, and the mating halves may then be bonded together by the use of a suitable adhesive or even by "sonic welding." The latter technique is particularly suitable for making a container 10 in that the two halves are placed in contiguous juxtaposition and then vibrated at frequencies in the ultrasonic range to produce heat at the contiguous surfaces which "welds" the two halves together.

Figure 3:
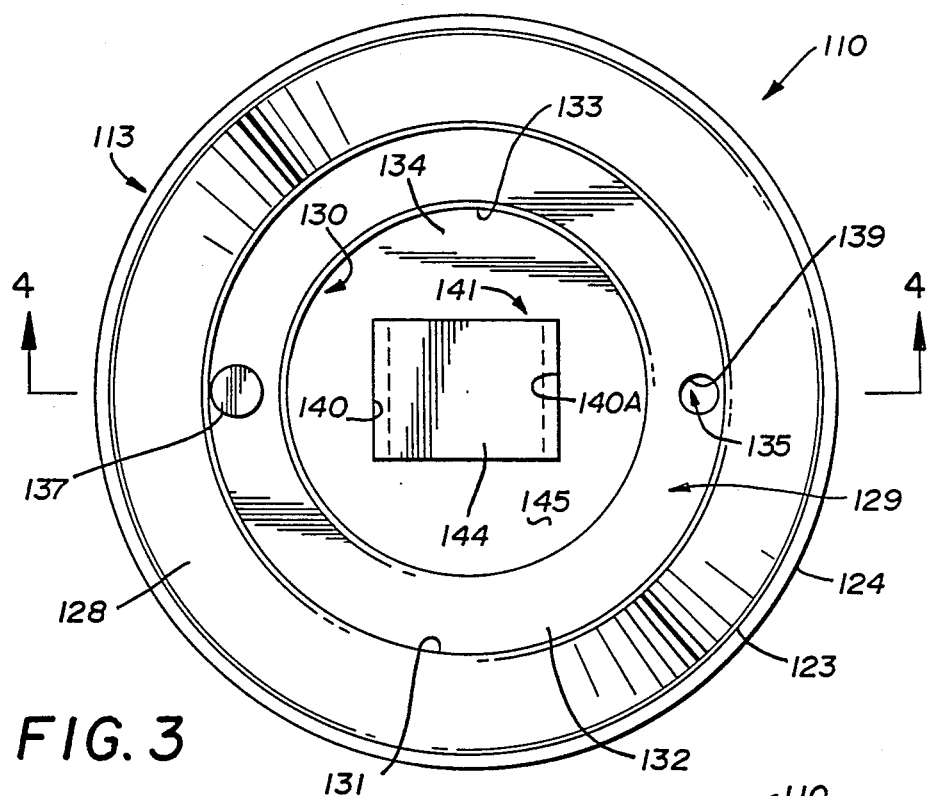
FIG. 3 is a top plan view, similar to FIG. 1, but depicting an alternative configuration for a floral container embodying the concepts of the present invention; and, FIG. 4 is a vertical section taken substantially along line 4—4 of FIG. 3.
Figure 4:
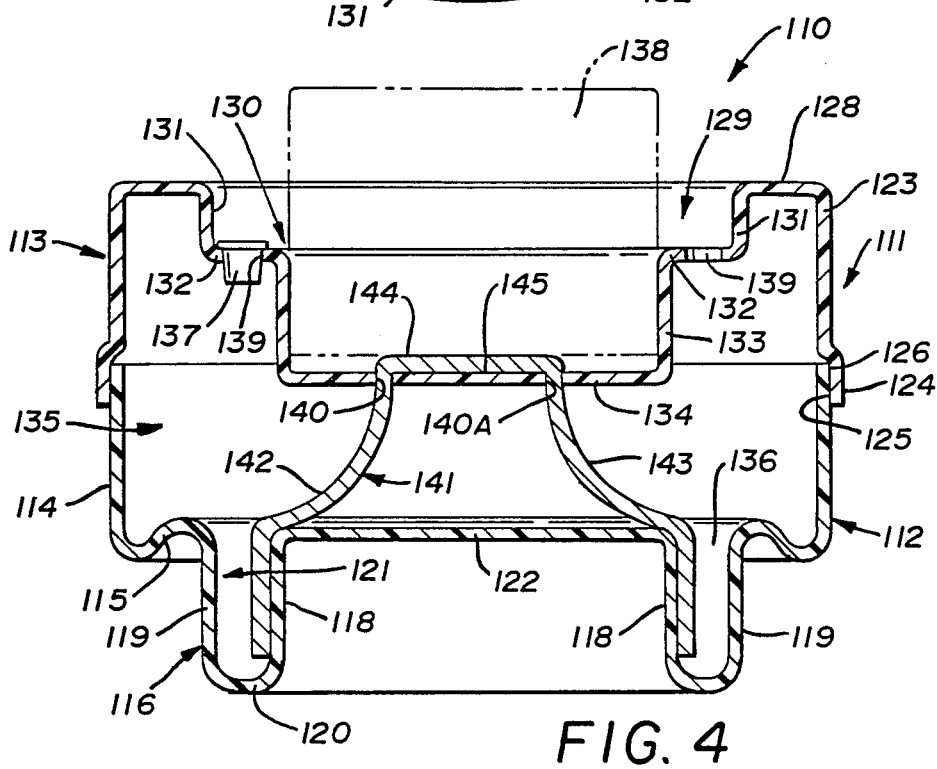

The alternative embodiment of a container embodying the concepts of the present invention is identified generally by the numeral 110 and is depicted in FIGS. 3 and 4. Although the overall configuration of container 110 may also be manufactured in one piece, the container 110 will be described as though it were made in two, mating halves and then bonded together.

With particular reference, then, to FIGS. 3 and 4, even though the container 110 presents an overall, peripheral, outer wall 111, the wall 111 may well be presented as the composite of the outer walls hereinafter described on the base and cap portions 112 and 113, respectively, which comprise the mating halves by which the container is formed.

The base portion 112 has an annular upper rim wall 114, the lower extremity of which merges with a horizontally disposed, reversely curved, S-shaped connecting wall 115 that extends radially inwardly from the rim wall 114 to merge with the foot portion 116. The configuration depicted for the connecting wall 115 is particularly suited for imparting hoop strength to the base portion 112; the S-shaped configuration for the connecting wall 115 is not otherwise critical to the novel aspects of the container 110.

The foot portion 116 has inner and outer walls 118 and 119 which define the respective inner and outer circumferential boundaries of the foot portion 116. The two walls 118 and 119 are joined at their lowermost extremities by an engaging wall 120 from which the container 110 can be supported, and the walls 118 and 119 extend upwardly from the engaging wall 120 to form a sump 121 within the resulting hollow foot portion 116. The upper extremity of the inner wall 118 merges with the vertically upwardly displaced bottom wall 122.

The cap portion 113 has an annular, upper rim wall 123, the lower extremity of which presents an offset belt 124, the radially inner surface 125 of which is configured to fit closely over the uppermost edge 126 of the rim wall 114 on the base portion 112 in order to facilitate bonding therebetween. The upper extent of the rim wall 123 terminates in a horizontally disposed, top wall 128 that circumscribes a well 129 which, in turn, surrounds a cavity 130. The well 129 has a vertically oriented boundary wall 131, that intersects a horizontally oriented floor 132. The top wall 128 of the cap portion 113 merges with the boundary wall 131 of the well 129. The cavity 130 has a peripheral wall 133 that extends vertically downwardly from the floor 132 of the well 129 to intersect a transversely oriented divider wall 134.

When the base and cap portions 112 and 113, respectively, are bonded together the resulting structure defines an interior chamber 135 which includes the sump 121. The chamber 135, therefore, similarly to the chamber 30 in container 10, serves as a reservoir for the fluid, indicated generally by the numeral 136, that is provided to extend the useful life of the floral arrangement supported by the container 110.

As best depicted in FIG. 4, the peripheral wall 133 which delineates the side of cavity 130 extends downwardly into the chamber 135. The cavity 130 is open at the top to permit facile insertion of a block of floral foam 138 therein. The block of floral foam 138 will, as is well known to the art, support an arrangement of fresh, cut flowers, not shown. It should also be appreciated that the dimensions of the block of floral foam 138 are such that the block 138 will fit snugly against the peripheral wall 133 of the cavity 130 and thereby effectively seal the divider wall 134 from the environmental atmosphere exterior of the container 110 when a block of floral foam 138 is received within the cavity 130. As depicted, the block 138, and the peripheral wall 133, may be cylindrical. However, it should be understood that in this embodiment, as well, any mating configuration between the block 138 and the peripheral wall 133 of cavity 130 is highly desirable.

At least one port 139 is provided through which the desired amount of fluid 136 may be poured into the chamber 135. The port 139 preferably penetrates the floor 132 of the well 129. By thus positioning the port 139 to penetrate the floor 132, it will be located below the level of the top surface 128 of the cap portion 113. As such, any fluid 136 within the chamber 135 that sloshes upwardly through the port 139 will enter the well 129 and either be usefully absorbed into the block of floral foam 138 received within the cavity 130 or will return to the chamber 135 through the port 139. A such, the necessity for employing a plug 137 selectively to close the port 139 is fairly well obviated. However, should one desire to employ a plug 137, the container 110 will still function as effectively as without the plug 137. This ability to eliminate the potential need for a plug 137 may well be an advantage in that eliminates the need for employing small parts that can be mislaid. The required volume for chamber 135 should be given consideration when selecting the overall dimensions for the container 110.

The divider wall 134 is also perforated by at least one slot 140 to permit a wick 141 to pass through the divider wall 134 so that the wick 141 can transfer the fluid 136 within the chamber 135, by capillary action, into the cavity 130. The fluid 136 within the cavity 130 is made available to the flower stems received within the block of floral foam 138, also by capillary action within the block 138. As in the alternative embodiment, container 10, two slots 140 and 140A are preferably provided through the divider wall 134 of container 110. The slots 140 and 140A are also laterally spaced and disposed in parallel relation to receive the wick 141 in the manner depicted in FIG. 4.

The wick 141 may be identical to wick 36 and need not, therefore, be described in further detail, except to point out that wick 141 is preferably of a band-like cross sectional configuration to present opposite end portions 142 and 143 that are separated by a medial portion 144. The opposite end portions 142 and 143 are received through the slots 140 and 140A, respectively, with the medial portion 144 disposed in contiguous juxtaposition with the upwardly directed face 145 of the divider wall 134. The end portions 142 and 143 are preferably disposed interiorly of the annular sump 121 provided by the hollow foot portion 116.

As in container 10 it is mandatory that the medial portion 144 of the wick 141 engage the block of floral foam 138 received within the cavity 130 of container 110 so that the fluid 136 within the wick 141 can be transferred into the block 138. It should be appreciated that by making the end portions 142 and 144 of the wick 141 fit snugly within the respective slots 140 and 140A, only the fluid 136 which is being transported along the wick 141 by capillary action will move through the slots 140 and 140A from the chamber 135 into the cavity 130.

The wick 141 employed with container 110 may also be made from polyester, or other inert material, that has an open weave which will promote capillary action. In addition, the wick 141 may also be impregnated with a floral preservative, as heretofore described, so that as the water is transported by the wick 141 from the chamber 135 to the cavity 130 it will progressively dissolve the floral preservative with which the wick 141 has been impregnated. Capillary action in the block 138 of foam will likewise transmit the water, and preservative, to the stems of the flowers that are supported within the block 138. This will keep the cut flowers in a fresh condition for an extended period of time.

Because the chamber 135 has only minimal, direct exposure to atmosphere, the level of the fluid 136 within the chamber 135 will similarly not be depleted by evaporation. Nor will the fluid 136 in the alternative container 110 be likely to spill as the container 110 is jostled during movement from one place to another. In addition, once the container 110 is filled with fluid, and thereafter delivered to the recipient, there is no further need to have anyone water the flowers. Thus, no more personal attention is required to maintain the flowers in a fresh condition in container 110 than in container 10.

However one chooses to manufacture the containers 10 or 110, the important characteristics to be incorporated in a container embodying the concepts of the present invention are: that an interior chamber 30, or 135, be provided which will not only serve as a reservoir for the desired fluid 31, or 136, but which will also be substantially, and selectively, sealed from the atmosphere; and, that a wick 36, or 141, be provided which will transport fluid 31, or 136, from the chamber 30, or 135, to a medium such as the block of floral foam 32, or 138, that may be used to support cut flowers in a desired arrangement.

It should be understood that the vertical dimension of the foot portion 116 accomplishes two objectives. First, the relatively large vertical dimension of the walls 118 and 119 which form the foot portion 116 compared with the relatively narrow spacing between the walls 118 and 119 allows the fluid 136 to concentrate within the sump 121 and thereby be available to wet the wick 141 for the longest period of time. Second, by making the overall radial dimension of the foot portion 116 equal to the overall radial dimension of the well 129, and by making the vertical dimension between the level of the engaging wall 120 on the foot portion 116 and the bottom wall 122 modestly greater than the height to which the block 138 extends above the foot 132 of the well 129, the containers 110 may be shipped in stacked position with each container 110 protecting the frangible block of floral foam 138 received within the cavity 130 of the container 110 immediately therebeneath.

To use the container 10, or 110, a florist will, in most instances, follow a procedure substantially as follows:

1. Insert a wick 36 (141) through the slots 35 and 35A (140 and 140A), if the wick has not already been inserted when the container is received by the florist;
2. Fill the container 10 (110) with water through one of the ports 33 (139);
3. Close the port 33 with a plug 34, if desired;
4. Insert a block 32 (138) of previously wetted floral foam into the cavity 20 (130) with sufficient force to bring the block 32 (138) into engagement with the medial portion 40 (144) of the wick 36 (141) which overlies the divider wall 25 (134) at the bottom of the cavity 20 (130); and,
5. Insert the stems of the cut flowers into the block of floral foam 32 (138) in the desired arrangement.

The container 10 (110), and the floral arrangement supported thereby, may then be delivered to the recipients's home, office or hospital room. During transportation, the unique configuration of the containers 10, or 110, prevents the water 31, or 136, from spilling out of the chamber 30, or 135, during transportation from the florist's shop.

The amount of water stored in the chamber 30, or 135, within the container 10, or 110, is predetermined to be an amount sufficient to maintain the flowers in a fresh condition throughout a reasonable period of usefulness for the particular flowers selected. The size of the chamber 30, or 135, is determined not only by the size of the arrangement that will be supported thereby but also by the amount of water normally required to maintain such an arrangement for its reasonable life expectancy.

All dimensions of the container 10, or 110, can be predetermined, and controlled, by selecting an appropriate mold, or molds, from which to form the container 10, or 110. The exact exterior configuration of the container 10, or 110, can also be predetermined in accordance with the aesthetic desires of the designer, and achieved during fabrication of the mold within which the container is formed.

Obviously many modifications and variations of the present invention are possible in light of the above teachings. It is, therefore, to be understood that within the scope of the appended claims the invention may be practiced otherwise than as specifically described. As should now be apparent, the present invention not only provides an improved floral container that incorporates a virtually unspillable chamber which serves as a reservoir for holding the liquid required to maintain and/or nourish a floral arrangement supported by the container but also otherwise accomplishes the objects of the invention.

We claim:

1. A container for floral arrangements comprising:
a chamber provided within said container for holding a predetermined volume of fluid;
a port for filling said chamber with fluid;
a cavity in said container;
wicking means for transferring fluid from said chamber to said cavity;
foam means insertably receivable within said cavity for supporting the individual flowers of a floral arrangement and for transporting the liquid within said cavity to the flowers of the floral arrangement supported in said foam means;
a divider wall separating said chamber from said cavity;
said wicking means passing through said divider wall to transport fluid, by capillary action, between said chamber and said cavity;
a well circumscribing said cavity and defining a substantially vertically oriented boundary wall having a vertical dimension and a substantially horizontally oriented floor having a width, said floor terminating in a peripheral edge having a diametrical dimension which defines the outer limit of said cavity; and,
a foot portion provided to support said container, said foot portion has a vertical dimension and a diametrical dimension which are substantially equal to the corresponding dimensions of said well such that two or more containers can be nested with the foot portion on each successively upper, nested container being received within the well of the container immediately therebelow.

2. A container for floral arrangements, as set forth in claim 1, wherein:
said foot portion has a vertical dimension;
said foam means has a vertical dimension measured upwardly of said well;
said vertical dimension of said foam means is less than the vertical dimension of said foot portion such that the foot portion of each nested container protects the foam means received within the cavity of the container nested immediately therebelow.

3. Apparatus for holding a floral arrangement of fresh cut flowers secured in a floral foam comprising:
container means having a continuous peripheral wall structure including a substantially cylindrical outer wall, a top surface integral with said substantially cylindrical outer wall and a bottom wall integral with said substantially cylindrical outer wall;
chamber means completely enclosed and defined within said container means for holding a predetermined volume of liquid;
cavity means defined within said top surface of said peripheral wall structure separate from, but adjacent to, said chamber means and opening outward from said top surface and being sized for holding a block of floral foam;
slot means formed in said container means for communicating between said chamber means and said cavity means;
wicking means having end portions extending through said slot means in snug engagement therewith into said chamber means and having a portion thereof disposed within said cavity means;
port means for filling said chamber means with liquid to a predetermined level above at least a portion of the end portions of said wicking means; and,
said wicking means being effective to transport liquid from said chamber means by capillary action to said cavity means while otherwise sealing said slot means.

4. Apparatus for supporting a floral arrangement secured in a floral foam block comprising:
container means having a continuous wall structure with an upper member having a top wall with an integral, downwardly depending cylindrical portion and a lower member having a bottom wall with an integral, upwardly extending cylindrical wall structure adjoining and bonded securely with said cylindrical portion of said upper member;
chamber means completely defined within said wall structure for holding a liquid and being substantially closed from the atmosphere;
cavity means defined within said top wall of said upper member of said continuous wall structure, said cavity means extending downwardly therefrom into said chamber means and separated therefrom by said top wall;
said cavity means being open to the atmosphere and sized for holding a block of floral foam in a secure manner sufficient to separate the cavity means from the atmosphere;
slot means piercing said top wall within said cavity means;
wicking means having end portions extending through said slot means into said chamber means in snug engagement therewith and having a portion thereof disposed within said cavity means in abutting relation with said top wall in a position to contact the block of floral foam;
port means in said wall structure for permitting liquid to be admitted into said chamber means to a predetermined level above at least a portion of said end portions of said wicking means, said wicking means being effective to transport liquid from said chamber by capillary action to said cavity means while otherwise sealing said slot means.

5. A container for floral arrangements, as set forth in claim 4, wherein:
said wicking means is impregnated with a floral preservative.

6. Apparatus for supporting a floral arrangement secured in a floral foam block, as set forth in claim 5, further comprising:
plug means for closing said port means and maintaining said chamber means out of direct contact with the atmosphere.

7. A container for floral arrangements comprising:
a chamber provided within said container for holding a predetermined volume of fluid;
a port for filling said chamber with fluid;
a cavity presented from said container;
wicking means for transferring fluid from said chamber to said cavity;
foam means insertably receivable within said cavity for supporting the individual flowers of a floral arrangement and for transporting the liquid within said cavity to the flowers of the floral arrangement supported in said foam means;
a divider wall separating said chamber from said cavity;
said wicking means passing through said divider wall to transport fluid, by capillary action, between said chamber and said cavity; and, a well circumscribing said cavity and being defined by a substantially vertically oriented boundary wall and a substantially horizontally oriented floor with said floor terminating in a circular edge which defines the outer limit of said cavity; and said foam means sealing said chamber against liquid passage into said cavity except through said wicking means.

8. A container for floral arrangements, as set forth in claim 7, wherein:

said port penetrates said floor.

9. A container for floral arrangements, as set forth in claim 7, wherein:

a foot portion is provided to support said container;

said foot portion has dimensions which are substantially equal to the dimensions of said well such that two or more containers can be stacked with the foot portion on each successively upper, stacked container being received radially outwardly of the foam means insertably received within the well of the container immediately therebelow.

* * * * *